United States Patent Office 3,616,734
Patented Nov. 2, 1971

---

3,616,734
DEVICE FOR DETACHABLY MOUNTING A PHOTOGRAPHIC FILM OR PLATE HOLDER ON A PHOTOGRAPHIC CAMERA
Yasuo Inoue, Konosu-shi, Japan, assignor to Olympus Optical Co., Ltd., Tokyo, Japan
Filed Jan. 20, 1970, Ser. No. 4,312
Claims priority, application Japan, Jan. 23, 1969,
44/4,988
Int. Cl. G03b *19/00, 27/58*
U.S. Cl. 95—11         4 Claims

ABSTRACT OF THE DISCLOSURE

Device for detachably mounting a photographic film or plate holder on an exposure window frame of a photographic camera comprising a pair of first levers each pivotally mounted at its one end on the respective opposite side of the window frame, a pair of second levers each pivotally connected at its one end to the other end of each of the first levers and a pair of springs each secured at its one end to each of the second levers and at its other end to a stationary portion of the camera so that the second levers are urged toward the window frame. The second levers are provided with longitudinal bent edge portions, respectively, adapted to engage with the holder mounted on the window frame so that the holder is held on the window frame. The first and second levers are formed with longitudinal elongated holes, respectively. A manually operable stud member is slidably fitted in the hole of the first lever as well as in the hole of the second lever pivotally connected to the first lever so that the second lever is urged toward the window frame to hold the holder on the window frame when the stud members are moved in one direction while the holder is released from the window frame when the stud members are moved in the opposite direction.

BACKGROUND OF THE INVENTION

The present invention relates to a device for detachably mounting a photographic film or plate holder on an exposure window frame of a photographic camera.

In a relatively large size photographic camera, it was well known that an exposure window frame is provided at the rear side of the camera to which a photographic film or plate holder is detachably attached so as to expose the film or plate therein when the camera is operated. A ground glass plate for inspecting the focusing of the image to be formed on the film or plate is detachably mounted on the window frame or hingedly secured to the window frame so as to swing the ground glass plate out of the optical path of the light for the exposure of the film or plate when the exposure is to be effected by mounting the holder on the window frame while the inspection of the focusing of the image is made when the ground glass plate is swung into the optical path in position after the holder is detached.

In particular photography such as the microscopic photography, the light for the exposure of the film or plate is divided into two portions, one of which is utilized for the exposure of the film or plate while the other portion is utilized for the inspection of the focusing of the image formed at a position conjugate to that to be formed on the film or plate thereby dispensing with the ground glass plate to be located on the window frame in place of the holder for the inspection of the focusing of the image.

Various film or plate holders produced by different makers are desired to be used with the large size photographic camera. Since the holders made by different makers or produced for the different uses have different thickness and weight depending upon the purposes thereof or the material housed therein although the window of the holder which is to be abutted to the window frame of the camera is made a predetermined standardized size.

Heretofore, the device for mounting the holder on the camera has been very simple and primitive comprising only plate springs attached to the sides of the window frame of the camera which must be manually moved apart from the window frame for mounting the holder between the springs and the window frame and, thereafter, engaged with the holder by freeing the springs so as to hold the holder.

However, by such a primitive device, it is very troublesome to mount the holder and the focusing of the image tends to be deteriorated, because the springs must be manually kept apart from the window frame while the holder is being mounted on the window frame by the same operator thereby causing undesired movement of the camera, or another person is required for safely and properly mounting the holder on the camera. Such a deterioration of the exact focusing of the image on the film or plate is particularly harmful in the case of particular photography such as the microscopic photography.

The present invention aims at avoiding the above described disadvantages and difficulties of the prior art device for mounting the holder on the camera and providing a novel and useful device for detachably mounting the holder on the camera in position with ease which is simple in construction and operation and can be made at a low cost.

SUMMARY OF THE INVENTION

The object of the present invention is to provide a novel and useful device for detachably mounting a photographic film or plate holder on a photographic camera which is simple in construction and operation and can be made at a low cost.

The above object is achieved in accordance with the present invention by the provision of a pair of first levers each pivotally mounted at its one end on the respective opposite side of an exposure window frame of the camera a pair of second levers each pivotally connected at its one end to the other end of each of the first levers so that the second levers can be freely swung as well as translated and a pair of springs each secured at its one end to each of the second levers and at its other end to a stationary portion of the camera so that the second levers are urged against the window frame, the second levers being provided with longitudinal bent edge portions, respectively, which engage with the holder mounted on the window frame so as to hold the same in position on the window frame, a longitudinal elongated hole being formed in each of the first and second levers, a manually operable stud member being slidably fitted in the elongated hole in the first lever as well as the elongated hole in the second lever pivotally connected to the first lever so that the second lever is positively urged against the window frame so as to hold the holder in position therebetween when the stud member is moved in one direction in the elongated holes while the holder is detached from the window frame when the stud member is moved in the opposite direction.

DETAILED DESCRIPTION OF THE PREFERRED EMBODIMENT

Figure 1:
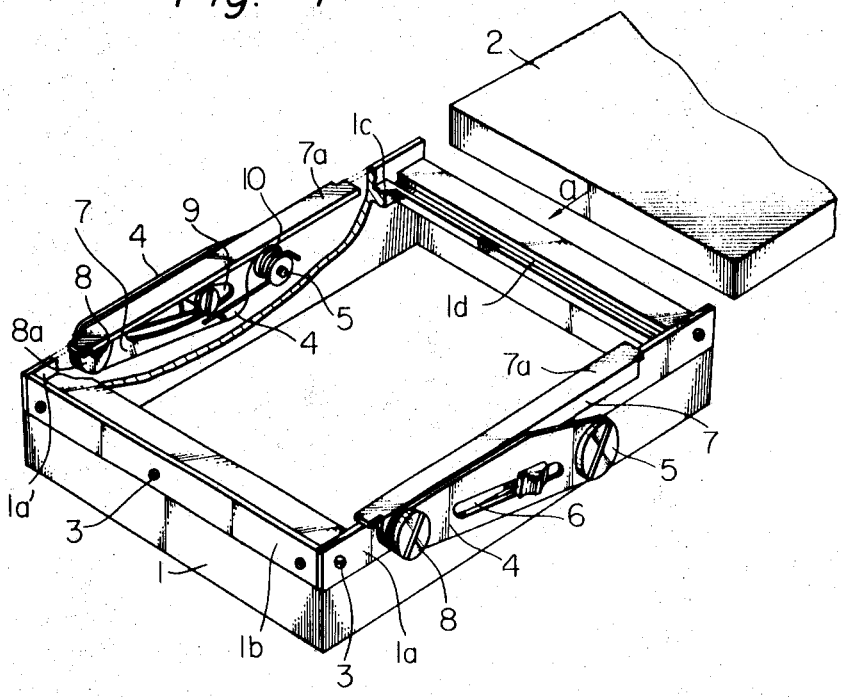
FIG. 1 is a perspective view partly broken away and showing the general construction of the device for detachably mounting the holder on the camera constructed in accordance with the present invention.
Figure 2:
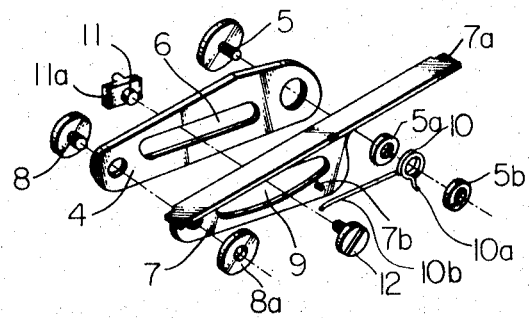
FIG. 2 is an exploded perspective view showing various elements of the device of FIG. 1.

In FIG. 1, an exposure window frame 1 is provided in a photographic camera (not shown). A photographic film or plate holder 2 is detachably mountable on the window frame 1 by sliding the holder 2 in the direction indicated by the arrow *a* along the window frame 1. The window frame 1 is provided with a pair of oppositely located fin-shaped edge members 1a, 1a' made of metallic strips and a fin-shaped edge member 1b made of a metallic strip at the respective sides of the window frame 1 as shown with one side of the window frame being adapted to slidably guide the holder 2 when the same is mounted on the window frame 1, each of the edge members 1a, 1a' and 1b being secured to the respective sides of the window frame 1 by means such as set screws 3. The distance between the opposite edge members 1a, 1a' is selected so that the holder 2 is snugly received therebetween when the holder 2 is loaded on the window frame 1. An elongated ledge 1c is provided along the inner walls of the window frame 1 which serves to position the holder 2 loaded on the window frame 1 in proper position lengthwise of the optical axis of the light for the exposure of the film or plate in the holder 2. The edge members 1b serves as a stopper limiting the sliding movement of the holder so as to locate the holder in position on the window frame 1 when the same is loaded thereon. A pair of first levers 4 are pivotally mounted on the respective sides of the window frame 1 on which the edge members 1a, 1a' are securely mounted by means such as stepped bolts 5 threaded into the sides of the window frame 1 as shown, distance pieces 5a, 5b being fitted on the bolts 5 so as to locate the first lever 4 at an appropriate distance spaced from the respective side of the window frame while the first lever 4 is permitted to be freely swung about the bolts 5. Each of the first levers 4 is provided with a longitudinal elongated hole 6 the purpose of which is described hereinafter.

A second lever 7 is located between the respective first lever 4 and the respective side of the window frame 1 and is pivotally connected at its one end to the free end of each of the first levers 4 by means of bolt 8 and nut 8a, an appropriate distance being provided between the second lever 7 and the side of the window frame 1 by the nut 8a. The second lever 7 is formed with a longitudinal elongated hole 9 having the width somewhat greater than that of the hole 6 while a longitudinal edge portion 7a is integrally formed in the upper longitudinal side edge of the second lever 7. The edge portion 7a is bent inwardly of the window frame 1 so that the edge portion 7a is engaged with the holder 2 when the second lever 7 is urged against the window frame 1 thereby clamping the holder 2 in position as described hereinafter. A spring 10 is provided around the bolt 5 between the spacers 5a and 5b with one end 10a secured to a stationary point of the window frame 1 while the other end 10b is abutted against a pin 7b fixedly secured to the second lever 7 as shown so that the second lever 7 is normally urged downwardly as shown in the drawing. The pivotal connection of the second lever 7 to the first lever 4 which is in turn pivoted around the bolt 5 secured to the window frame 1 permits the second lever 7 to effect rotational movement as well as translational movement.

A stud member 11 having a diameter corresponding to the width of the elongated hole 6 and a manually operable knob 11a secured integrally thereto is slidably fitted in the elongated hole 6 of the first lever 4 as well as the elongated hole 9 of the second lever 7 which is pivotally connected to the first lever 4 and a set screw 12 is screwed into the outer end of the stud member 11 so that the stud member 11 is prevented from being removed from the elongated holes 6, 9 while free sliding movement of the stud member 11 in the elongated holes 6, 9 is permitted.

The location of the elongated hole 6 in the first lever 4 and the location of the elongated hole 9 in the second lever 7 are selected such that, when the stud member 11 is moved in the elongated holes 6, 9 in the direction away from the pivotal connection 8 of the first and second levers 4, 7, the second lever 7 is swung close to the first lever 4 so that the second lever 7 is positively urged against the window frame 1 thereby permitting the holder 2 to be clamped between the edge portion 7a and the window frame 1 while the second lever 7 is swung apart from the first lever 4 when the stud member 11 is moved in the direction toward the pivotal connection 8 thereby permitting the second lever 7 to be moved apart from the window frame 1 so that the holder 2 is easily detached from the window frame 1.

In accordance with a feature of the present invention, an upper inclined edge portion 9a is provided in the inner surface of the elongated hole 9 adjacent to one end thereof nearer to the pivotal connection 8. The inclined edge portion 9a serves to rapidly swing the second lever 7 upwardly apart from the first lever 4 when the stud member 11 is moved toward the pivotal connection 8 so as to contact with the inclined edge portion 9a thereby facilitating the removal of the holder 2.

In accordance with another feature of the present invention, an elongated stopper groove 1d is provided in the side of the window frame on which no edge member is provided. The groove 1d is adapted to snugly receive a raised stopper portion (not shown) formed in the holder 2 when the same is located in position on the window frame 1 so that the holder 2 is positively held in position by the engagement of the raised stopper portion in the groove 1d.

Figure 3:
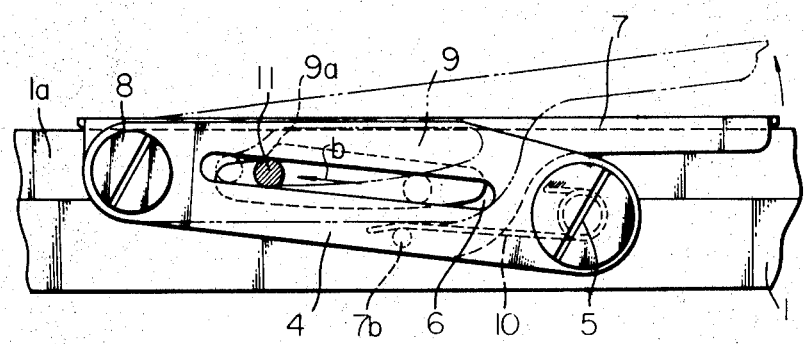
FIGS. 3 to 5 are schematic views showing various phases of the operation of the device of FIG. 1.

The operation of the device of the present invention as described above is as follows:

Normally, the edge portions 7a of the second levers 7 are urged against the window frame 1 by the action of the springs 10, respectively, as shown in solid line in FIG. 3.

In order to load the holder 2 on the window frame 1, the manually operable knobs 11a are actuated so as to move the respective stud members 11 in the elongated holes 6, 9 in the direction toward the pivotal connection 8 of the first and second levers 4, 7 as indicated by the arrow *b* in FIG. 3. Then each of the stud members 11 is slidingly moved in the elongated holes 6, 9 in contact with the lower edge of the hole 6 and the upper edge of the hole 9 by the action of the spring 10 so that the second lever 7 is swung apart from the first lever 4 while free pivotal movement of the first lever 4 about the bolt 5 is permitted, thereby freeing the edge portion 7a of the second lever 7 from the window frame 1 for facilitating the loading of the holder 2 on the window frame 1 without requiring the respective second levers 7 to be manually moved apart from the window frame 1 against the action of the springs 10 as shown in FIG. 4.

Figure 4:
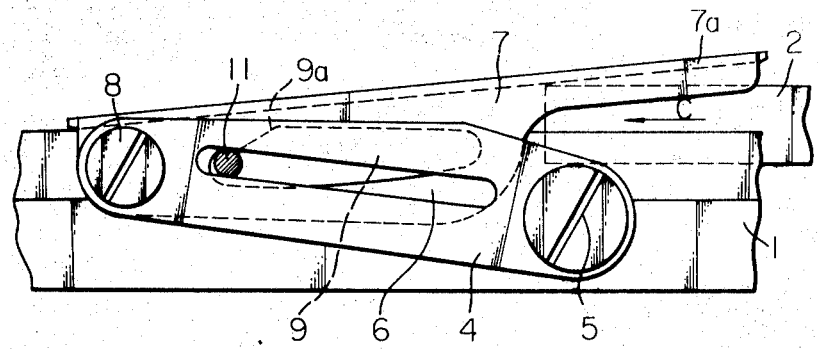
Figure 5:
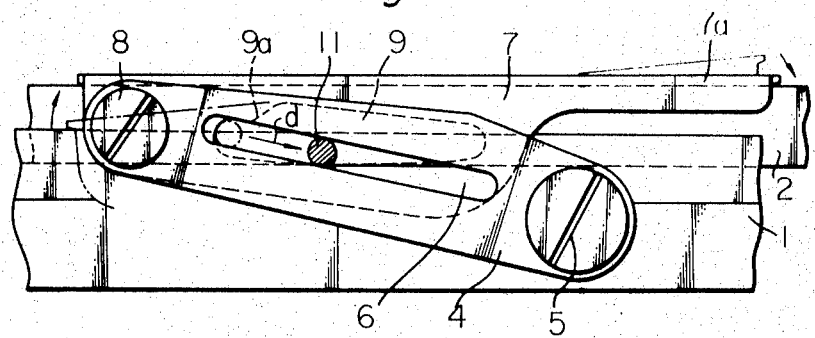

When the holder 2 is inserted between the edge portion 7a of the second lever 7 and the window frame 1 by sliding the holder 2 in the direction indicated by the arrow *c* in FIG. 4, the second lever 7 is freely swung about the bolt 5 so that the insertion of the holder 2 is facilitated. After the holder 2 is moved until the forward end thereof abuts against the edge member 1b, the stud member 11 is manually moved in the direction indicated by the arrow *d* in FIG. 5 thereby forcibly swinging the second lever 7 close to the first lever 4 so that the second lever 7 is urged against the window frame 1 with the edge portion 7a being engaged with the holder 2 so as to hold the holder 2 in position on the window frame 1. The pivotal movement of the second lever 7 together with the first lever 4 about the bolt 5 affords the uniform clamping force of the edge portion 7a.

The upper inclined edge portion 9a of the hole 9 permits the second lever 7 to be rapidly swung upwardly when the stud member 11 contacts the inclined edge portion 9a when the stud member 11 is moved in the direction indicated by the arrow b in FIG. 3, thereby facilitating the removal of the holder 2.

As previously described, the groove 1d assures the positive positioning of the holder 2 in proper position when the raised mating portion of the holder 2 is fitted in the groove 1d.

The engagement of the raised mating portion of the holder 2 with the groove 1d further provides light tight engagement of the holder 2 with the window frame 1.

I claim:

1. Device for detachably mounting a photographic film or plate holder on an exposure window frame of a photographic camera, wherein the improvement comprises a pair of first levers each pivotally mounted at its one end on the respective opposite side of said window frame, a pair of second levers each pivotally connected at its one end to the other end of each of said first levers so that they are swung as well as translated in the planes substantially parallel to the respective opposite sides of said window frame and a pair of springs each secured at its one end to the respective second lever and at its other end to a stationary portion of said camera, respectively, so as to urge the respective second levers toward said frame portion, each of said first levers being formed with an elongated hole extending substantially lengthwise of said first lever while each of said second levers is formed with an elongated hole substantially lengthwise of said second lever, each of said second levers being provided with a longitudinal bent edge portion adapted to engage with said holder when the same is mounted on said window frame by the action of said spring so that said holder is held in position on said window frame, a manually operable stud member being slidably fitted in said elongated hole of said first lever as well as in said elongated hole of said second lever pivotally connected to said first lever, thereby permitting said second lever to be positively urged against said window frame so as to resiliently hold said holder mounted on said window frame by said longitudinal bent edge portion when said stud member is moved in said elongated holes of said first and second levers in the direction away from the pivotal connection thereof while said holder is detached from said window frame when said stud member is moved in the direction toward said pivotal connection of said first and second levers.

2. Device according to claim 1, wherein an upper inclined edge portion is formed at one end of said elongated hole of each of said second levers at the side adjacent to said pivotal connection of said first and second levers so that the free end of said second lever is positively swung apart from said window frame when said stud member is moved toward said pivotal connection so as to engage with said upper inclined edge portion thereby facilitating the attachement as well as the detachment of said holder to said window frame.

3. Device according to claim 1, wherein said window frame is provided with a stopper edge member at one side of said window frame connecting the opposite sides thereof on which said first levers are pivotally mounted, respectively, so that said holder is held properly in position by the abutment of a side of said holder against said stopper edge portion.

4. Device according to claim 3, wherein said window frame is provided with a latching groove extending in the side of said window frame opposite to said side on which said stopper edge member is provided, said latching groove being adapted to snugly receive an elongated raised latching portion of said holder when the same is mounted on said window frame so that said holder is positively held in position.

References Cited
UNITED STATES PATENTS

| | | | |
|---|---|---|---|
| 1,073,442 | 9/1913 | Schmid | 95—19 |
| 2,488,434 | 11/1949 | Pratt et al. | 95—19 |

SAMUEL S. MATTHEWS, Primary Examiner

R. A. WINTERCORN, Assistant Examiner

U.S. Cl. X.R.

95—19; 355—72